United States Patent
Yoshikawa et al.

(10) Patent No.: US 7,525,451 B2
(45) Date of Patent: Apr. 28, 2009

(54) NAVIGATION SYSTEMS, METHODS, AND PROGRAMS

(75) Inventors: Kazutaka Yoshikawa, Okazaki (JP); Kenji Nagase, Okazaki (JP); Toshiaki Minami, Okazaki (JP); Hiroshi Tomita, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 588 days.

(21) Appl. No.: 11/066,189

(22) Filed: Feb. 25, 2005

(65) Prior Publication Data

US 2005/0209772 A1 Sep. 22, 2005

(30) Foreign Application Priority Data

Mar. 22, 2004 (JP) ............................. 2004-083339

(51) Int. Cl.
  *G08G 1/123* (2006.01)
  *G01C 21/00* (2006.01)

(52) U.S. Cl. ........................ 340/995.13; 340/995.11; 340/995.19; 701/117; 701/211; 701/209; 701/201; 342/357.09; 342/357.1

(58) Field of Classification Search ................ 701/207, 701/209; 340/995.13, 995.19
See application file for complete search history.

(56) References Cited

U.S. PATENT DOCUMENTS

| | | | | |
|---|---|---|---|---|
| 5,220,507 A * | 6/1993 | Kirson | ........................ | 701/202 |
| 5,822,712 A * | 10/1998 | Olsson | ........................ | 701/117 |
| 5,915,207 A * | 6/1999 | Dao et al. | ....................... | 455/9 |
| 6,427,117 B1 * | 7/2002 | Ito et al. | ...................... | 701/209 |
| 6,480,783 B1 * | 11/2002 | Myr | ............................ | 701/117 |
| 6,615,133 B2 * | 9/2003 | Boies et al. | ................... | 701/209 |
| 6,904,362 B2 * | 6/2005 | Nakashima et al. | .......... | 701/211 |
| 6,950,745 B2 * | 9/2005 | Agnew et al. | ................ | 701/210 |
| 7,050,905 B2 * | 5/2006 | Nemeth | ....................... | 701/201 |
| 7,117,245 B1 * | 10/2006 | Levkoff et al. | ............... | 709/206 |
| 7,176,813 B2 * | 2/2007 | Kawamata et al. | ...... | 340/995.13 |
| 7,292,936 B2 * | 11/2007 | Furukawa | ..................... | 701/209 |
| 2002/0082767 A1 * | 6/2002 | Mintz | ........................... | 701/117 |
| 2002/0128766 A1 * | 9/2002 | Petzold et al. | .............. | 701/201 |
| 2005/0080552 A1 * | 4/2005 | Feldman et al. | ............. | 701/120 |
| 2005/0222763 A1 * | 10/2005 | Uyeki | ......................... | 701/210 |
| 2006/0031009 A1 * | 2/2006 | Brulle-Drews | .............. | 701/209 |

FOREIGN PATENT DOCUMENTS

| | | | |
|---|---|---|---|
| JP | A 08-338736 | | 12/1996 |
| JP | 2004257829 A | * | 9/2004 |

OTHER PUBLICATIONS

"An introduction to Time Waveform Analysis" Timothy A. Dunton, Universal Technologies Inc. 25797 Conifer Road #C210 Aspen Park Co, 80433, www.unitechinc.com, 1999.*

* cited by examiner

*Primary Examiner*—Khoi Tran
*Assistant Examiner*—Lin B Olsen
(74) *Attorney, Agent, or Firm*—Oliff & Berridge, PLC

(57) ABSTRACT

Navigation systems, methods, and programs store traffic information and crated prediction traffic information based on the stored traffic information. The systems, methods, and programs search a plurality of routes to a destination, each route including at least one link and calculate a predicted passage time of each link in each route. The systems, methods, and programs obtain, for each link, prediction traffic information at the predicted passage time, based on the created prediction traffic information and extract the obtained prediction traffic information pertinent to route-search-as information to be distributed, according to a predetermined order of priority.

20 Claims, 9 Drawing Sheets

NAVIGATION SYSTEMS, METHODS, AND PROGRAMS

INCORPORATION BY REFERENCE

The disclosure of Japanese Patent Application No. 2004-083339 filed on Mar. 22, 2004, including the specification, drawings and abstract thereof, is incorporated herein by reference in its entirety.

BACKGROUND

1. Related Technical Fields

Related Technical Fields include navigation systems and methods.

2. Description of the Related Art

In a conventional automobile navigation device, an operator sets a destination by operating an input unit. A route from a current location to a destination is searched based on the destination and the current location of the vehicle detected by a current location detector. The conventional navigation device then guides the operator along the searched route. Conventionally, the optimal route is searched so that the distance from the current location to the destination is shortest, or so that the time required to reach the destination is the shortest.

Conventionally, a system for transmitting road traffic information to the navigation device may be provided. Accordingly, road congestion information may be received and the optimal route can be searched by avoiding congested sections (e.g., see Japanese Unexamined Patent Application Publication No. 8-338736). For example, in one road traffic information communication system called VICS® (Vehicle Information & Communication System), information from traffic control systems is collected. Road traffic information, such as road congestion and traffic restriction, is created and transmitted to the navigation device. The navigation device then searches an optimal route for which the time required to reach the destination is the shortest, based on the road traffic information.

Conventionally, a server of an information center distributes traffic information of a specified area to the navigation device, and the navigation device uses the received traffic information to perform DRG (Dynamic Route Guidance).

SUMMARY

However, according to the above-described conventional system, the received road traffic information is only current traffic information relating the current traffic conditions. For example, the road traffic information transmitted by VICS®, is generally the current traffic information that relates to the traffic between the vehicle's current position and a position just ahead of the vehicle, for example, tens of kilometers ahead of the vehicle. Thus, according to the above-described conventional system, even if a route is searched using the current traffic information, the traffic conditions beyond the range of the current traffic information may change by the time the vehicle actually passes. Accordingly, a route with the shortest time required to reach the destination cannot be searched reliably.

In conventional DRG, the amount of data that is sent between the server of the information center and the navigation device is great. As a result, the communication time is long, and communication costs are high. Data related to links that have no relationship to the route to the destination are distributed to the navigation device further increasing the amount of data that is sent between the server of the information center and the navigation device. Furthermore, because the amount of data sent becomes so great, data relating to links of substitute routes cannot be distributed to the navigation device.

In conventional systems, data relating to a passage point on the route searched by the server of the information center may be distributed to the navigation device. Such passage point data cannot be used unless the map data used by the information center server and the map data used by the navigation device are the same version, i.e., one is not more up-to-date than the other.

At least in view of the above-described deficiencies in conventional systems, it is beneficial to provide a navigation system wherein a server effectively and efficiently distributes information useful for searching a route, thereby enabling the onboard device to search a route by avoiding traffic congestion.

To this end, various implementations of the principles described herein include a navigation system that may include a memory that stores traffic information and a controller. The controller may create prediction traffic information based on the traffic information stored in the memory and searches a plurality of routes to a destination, each route including at least one link. The controller may calculate a predicted passage time of each link in each route and obtains, for each link, prediction traffic information at the predicted passage time, based on the created prediction traffic information. Then, the controller may extract the obtained prediction traffic information pertinent to route searching as information to be distributed, according to a predetermined order of priority.

Various implementations of the principles described herein include a navigation system that may include a server and an onboard device. The server may include a memory for storing traffic information and a controller. The controller may create prediction traffic information based on the traffic information stored in the memory and searches a plurality of routes to a destination, each route including at least one link. The controller may calculate a predicted passage time of each link in each route and obtains, for each link, prediction traffic information at the predicted passage time, based on the created prediction traffic information. Then, the controller may extract the obtained prediction traffic information pertinent to route searching as information to be distributed, according to a predetermined order of priority. The onboard device may perform a route search using the information to be distributed to search a route to said destination.

Various implementations of the principles described herein include a navigation method that may include storing traffic information and creating prediction traffic information based on the stored traffic information. The method may include searching a plurality of routes to a destination, each route including at least one link and calculating a predicted passage time of each link in each route. The method may include obtaining, for each link, prediction traffic information at the predicted passage time, based on the created prediction traffic information and extracting the obtained prediction traffic information pertinent to route search as information to be distributed, according to a predetermined order of priority.

Various implementations of the principles described herein include a storage medium storing a set of program instructions executable on a data processing device and usable for performing the above described method.

BRIEF DESCRIPTION OF THE DRAWINGS

Exemplary implementations will now be described with reference to the accompanying drawings, wherein.

DETAILED DESCRIPTION OF EMBODIMENTS

Figure 2:
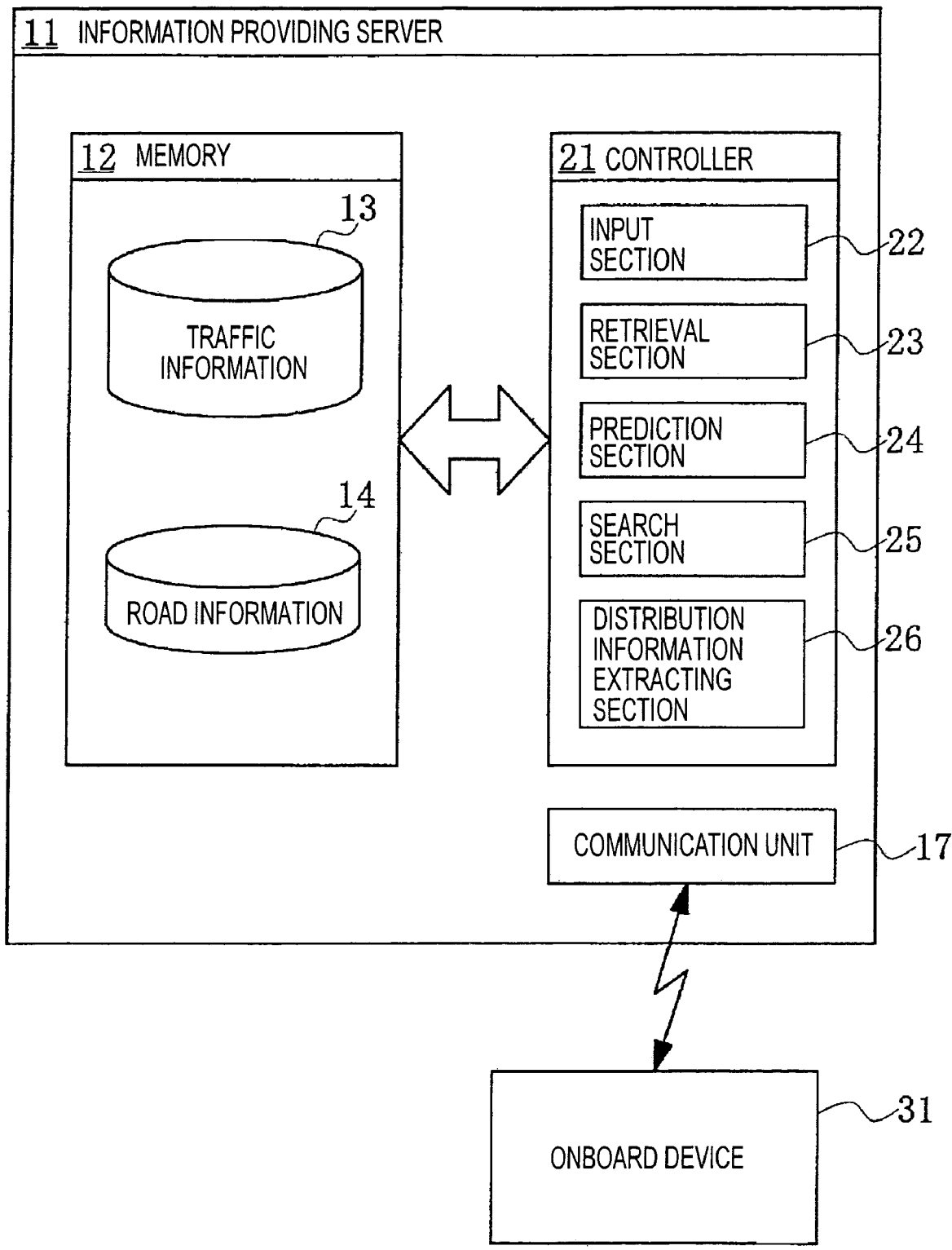
FIG. 2 is a diagram illustrating the configuration of a navigation system according to an exemplary implementation of the principles described herein.

FIG. 2 is a diagram illustrating the configuration of a navigation system according to an exemplary implementation of the principles described herein. FIG. 2 shows an information providing server 11 that may be, for example, configured within a computer or computers. The information providing server 11 may include a controller 21, such as, for example, a CPU and/or MPU. The information providing server 11 may include a memory 12 such as, for example, a semiconductor memory, a magnetic disk, and/or an optical disk. The information providing server 11 may include a communication unit 17. It should be appreciated that, according to various implementations wherein the information server 11 is provided in one or more computers, various other related or unrelated systems may also be provided within the computer(s).

FIG. 2 shows an onboard device 31 that may be operated by an operator, such as, for example, a driver, a passenger, and/or any other person, and may be installed in a vehicle such as, for example, an automobile, truck, bus, or motorcycle. Note that, according to various exemplary implementations, there may be more than one onboard device 31 in more than one vehicle. For the purpose of those exemplary implementations, the onboard device 31 may represent multiple onboard devices 31 in multiple vehicles.

The onboard device 31 may include a controller, such as, for example, a CPU and/or MPU. The onboard device 31 may include a memory, such as, for example, a semiconductor memory, a magnetic disk, and/or an optical disk. The onboard device 31 may include a display device, such as, for example, an LCD (Liquid Crystal Display), an LED (Light Emitting Diode) display, and/or a CRT (Cathode Ray Tube). The onboard device 31 may include an input device, such as, for example, a keyboard, a joystick, arrow keys, pushbuttons, a remote controller, and/or touch panel. The onboard device 31 may include a display control device for controlling the display device and/or a communication unit. The onboard device 31 may be a navigation device according to this implementation. However, any device capable of such functions may be used, such as, for example, a fixed telephone device, a cellular telephone, a PHS (Personal Handy-Phone System) telephone, a portable information terminal, a PDA (Personal Digital Assistant), a personal laptop or palmtop computer, an onboard computer, a gaming device, and/or digital television receiver.

Further, the onboard device 31 may include a current location detecting device. If the onboard device 31 is, for example, a navigation device the current location detecting device may, for example, detect the current location generally by GPS (Global Positioning System), a geomagnetism sensor, a distance sensor, a steering sensor, a beacon sensor, and/or a gyro sensor. If the onboard device is, for example, a cellular telephone, portable information terminal, or the like, the current location may be detected as, for example, based on the position of one or more base stations that are in range the cellular telephone, portable information terminal, or the like.

The information providing server 11 and the onboard device 31 may be connected via a network, so as to mutually communicate. The network may include, for example, a cable or wireless public communication line network, a dedicated communication line network, a cellular telephone line network, the Internet, an intranet, a LAN (Local Area Network), a WAN (Wide Area Network), a satellite communication line network, CS or BS broadcasting satellites, terrestrial television broadcasting, FM multiplex broadcasting, optical beacons, airwave beacons, and/or any other communication means, network or combination of networks suitable for communication.

According to various exemplary implementations, a navigation system may be composed of the information providing server 11 and the onboard device 31. In such a case, the operator may be registered with the navigation system beforehand and may be issued a registration ID. Also, the onboard device 31 may be registered with the navigation system beforehand.

Returning to FIG. 2, the memory 12 may store, for example, information necessary for creating congestion prediction information. The controller 21 may access the memory 12 to obtain necessary information and may create congestion prediction information. The memory 12 may be physically, functionally, and/or conceptually divided into at least a traffic information portion 13 and a road information portion 14.

The traffic information portion 13 may store road traffic information, such as, for example, information regarding road congestion and/or road traffic restriction information, for example, created by collecting information from traffic control systems such as the police and other authorities via a road traffic information communication system, such as VICS®. Information regarding past road congestion may also be accumulated as statistical congestion information. The traffic information section 13 may store, for example, statistical congestion information and/or congestion prediction information such as, for example, event prediction information (for example, dates and locations for events such as festival parades, firework shows), information that roads around a station or major commercial facility are congested (i.e., at a particular time every day except for weekends), and/or information that roads around a bathing beach are congested during the summer vacation period.

Such statistical congestion information and congestion prediction information may be correlated with a VICS® link (described below). Further, the traffic information section 13 may store information provided from other operators registered beforehand. The information from other operators may include, for example, detailed information regarding road traffic information such as, for example, road congestion information and/or traffic rule enforcement information (information regarding enforcement by police, traffic restrictions placed due to road work or construction or the like). In the case of road congestion information, the detailed information may include, for example, the actual length of the traffic jam, the cause of congestion, and/or a time at which the congestion can be expected to dissipate. In the case of traffic rule enforcement information, the detailed information may include, for example, the type of enforcement (such as, for example, speed violation enforcement or parking violation enforcement), as well as the location, day of the week, and/or time frame. In the case of traffic restriction, the detailed information may include, for example, the time period during which road work or construction is going to be performed, the type of traffic restriction (such as, for example, impassible lanes, alternating traffic in both directions through a single lane, and/or lanes closed), and/or the time frame of traffic restriction, and so forth. The traffic information section 13 may also store link travel time patterns accumulated in the past.

As used herein, the term "link" refers to, for example, a road or portion of a road. For example, according to one type of road data, each road may consist of a plurality of componential units called links. Each link may be separated and defined by, for example, an intersection, an intersection having more than three roads, a turn, a curve, and/or a point at which the road type changes or crosses a jurisdictional boundary. The term "intersection" encompasses not only intersections where traffic lights are provided but also intersections where traffic lights are not provided.

The traffic information section 13 may store, for example, information regarding links necessary for providing traffic information. Furthermore, road link IDs serving as an identification for the links making up the road, i.e., may also be stored in the traffic information section 13.

The VICS® information, which is traffic information from VICS®, may include VICS® link IDs along with information, such as, for example, type information, location, distance of congested sections, degree of congestion, and so forth. A VICS® link ID is an identification number assigned to a VICS® link. A VICS® link is a driving guidance link obtained by dividing a road at each intersection and standardizing the road data. Note that VICS® information may also include information such as, for example, coordinates of the starting point and ending point of each VICS® link, distance from the starting point to the ending point, and so forth.

It should be noted that a VICS® link is not the same as a link, defined above and stored in the traffic information section (hereinafter "road links"). Generally, the road links stored in the information section 13 are, for example, divided finer than VICS® links. Accordingly, navigation devices having VICS® functions may have a conversion table (comparison table) between road link IDs and the VICS® link IDs, so that corresponding road link IDs can be determined based on the VICS® link IDs. Accordingly, in the event that the onboard device 31 has the conversion table as with a navigation device, upon reception of a VICS® link ID from the information providing server 11, the section of the road for which VICS® information is to be displayed can be determined based on the VICS® link ID.

However, in the event that the onboard device 31 does not have the conversion table, the onboard device cannot determine the road link section based on the VICS® link ID. Accordingly, the traffic information section 13 may also store the conversion table. Thus, the VICS® link ID may be converted into the road link ID used by the onboard device 31, and the converted VICS® information may be transmitted to the onboard device 31.

Also, in the event that the onboard device 31 does not include a map information or the like, and thus cannot create a map, a map to be displayed on the screen may be created as image information by the information providing server 11. This image information may then be transmitted to the onboard device 31 and an image based on the image information may be displayed on the display device of the onboard device 31. For ease of explanation, for the purpose of this example, it is assumed that the conversion table is stored in the traffic information database 13 and is used to determine the road section corresponding to the VICS® link ID. Note that the traffic information database 13 may also store speed patterns created by a prediction processing section 24 based on, for example, statistical congestion information and/or link-related information.

The road information section 14 may store-information regarding all roads nationwide, including, for example alleys and unmarked roads. The road information section 14 may also store, for example, intersection information, node information, road information, traffic restriction information, and/or route display information. As used herein the term "node" refers to a point at which two or more road links intersect.

The intersection information may include, in addition to the number of intersections for which data is stored, for example, numbers for identifying each intersection. Further, the intersection information may include numbers for identifying the roads connecting thereto, in addition to the number of roads connecting to the intersection, i.e., the connecting roads. The intersection information may include the type of intersection, for example, whether a traffic light is provided or not. The node information may include, for example, at least the road location and/or shape and may be included in the map data. The node information may include information indicating, for example, actual road branches (including all types of intersections), nodes, and links linking between nodes. Further, the nodes may indicate at least road bending points.

Also, in addition to the number of roads for which data is stored, the road information section 14 may store, for example, numbers for identification, for each road. The road information section 14 may store, for example, by type of road, distance indicating the length of each road, and/or travel time (i.e., the amount of time necessary to drive each road). Road type may include road jurisdiction attributes, such as, for example, whether a road is a federal highway, a state highway, a main thoroughfare, a general road, or a freeway.

The road information section 14 may store, for example, information regarding the road itself, such as road width, grade, superelevation, altitude, bank, surface state, whether a median exists, number of lanes of the road, points where the number of lanes is reduced, and/or points where the road width is reduced. In the case of freeways and/or arterial roads, each of the opposing lanes may be stored as separate roads, and processed as separate roads. For example, if an arterial road has two or more lanes in each direction, the inbound lanes and outbound lanes may each be treated as independent roads. Turn information may include, for example, curvature radius, intersections including T-intersections, and/or corner entrances. Information related to, for example, freeway on-ramps and off-ramps, tollbooths in the case of toll roads, uphill stretches, downhill stretches, and other road attributes may also be stored in the road information section 14.

The memory 12 may include a map information section (not shown) that stores, for example, map information. The memory 12 may include a POI (Point Of Interest) information section (not shown). Now, the map information section may store map information such as, for example, nodes, links, coordinates, and/or names of facilities, used for drawing maps. The POI information section may store, for example, facility information, telephone directory information, event information, point of departure information, destination information, and/or waypoint information.

The POI information section may include detailed information relating to facilities or the local area. For example, if a facility is an eatery such as, for example, a restaurant or a diner, the detailed information may include, for example, days open for business, business hours, phone number, menu, prices, evaluation of the quality of food, evaluation of service, atmosphere, and/or whether parking is available. If the facility is a commercial facility such as, for example, a convenience store, department store, home improvement center, and/or a supermarket, the detailed information may include days open for business, business hours, phone number, goods carried, prices, bargain sale dates, evaluation of service, atmosphere, bargain sale goods, whether parking is available, and/or types and periods of events occurring at the facility. If the facility is an entertainment facility such as, for example, a theme park, a gaming arcade, a movie theater, and/or a stage theater, the detailed information may include, for example, days open for business, business hours, phone number, description of the facility, prices, evaluation of service, atmosphere, whether parking is available, and/or types and periods of events.

The memory 12 of the information providing server 11 including the traffic information section base 13 and the road information section 14 may be, for example, an internal storage medium of the information providing server 11, or may be an external storage medium. The memory 12 may be of any type, such as, for example, a magnetic tape, a magnetic disk, a magnetic drum, a CD-ROM, a CD-R/RW, an MD, a DVD-ROM, a DVD-RAM, a DVD-R/RW, an optical disk, an MO, an IC card, an optical card, a memory card, so-called stick memory, and/or a combination of any of the aforementioned.

The controller 21 may be physically, functionally, and/or conceptually divided into at least an input section 22, a retrieval section 23, a prediction section 24, a search section 25, and/or a distribution information extracting section 26. The input section 22 may, for example, input distribution requests for DRG (Dynamic Route Guidance) received from the onboard device 31, and/or distribution requests for facilities and points. DRG is searching for a route by using traffic information in order to account for, for example, traffic restrictions and/or traffic congestion.

The retrieval section 23 may, for example, retrieve facilities or points based on retrieval conditions contained in retrieval requests received from the onboard device 31. The prediction section 24 may, for example, create prediction traffic information based on, for example, traffic information stored in the traffic information section 13. Specifically, prediction link travel time patterns may be created based on link travel time patterns stored in the traffic information section 13. Congestion prediction information may be created based on the prediction link travel time pattern. The search section 25 may, for example, search multiple routes to the destination and/or create cost information by calculations of predicted passage time of each link in each route based on the prediction traffic information. Specifically, routes to a destination may be searched from a current position as a point of departure, based on, for example, the current location, destination, and/or search conditions contained in a data distribution request, received from the onboard device 31.

As used herein the term "cost" refers to a measure of the desirability that a link be included in a route. Cost considerations may include, for example, length of the link, time required to travel the link, the type of road, number and/or type of intersections on the link, speed limit, actual and/or predicted traffic conditions, time of day, and/or a user's propensity to use the link. Typically a cost value may be associated with a link and the cost values for each link in a prospective route are added in order to determine the overall cost of a prospective route. Then, the cost of the various prospective routes may be compared in order to determine a route for guidance. As new information for a link becomes available, for example, traffic information is updated, a links cost value may be recalculated and the route prospective routes re-evaluated.

The distribution information extracting unit 26 may, for example, extract distribution information useful for DRG, according to, for example, a predetermined order of priority. Specifically, restriction information and congestion prediction information may be extracted as distribution data with a higher priority. Also, congestion prediction information of the route with a longer travel time may be extracted as distribution information with a higher priority from among the multiple routes within the same section.

The information providing server 11, as a result, may, for example, search multiple routes to the destination, calculate predicted passage times for passing each link in each of the routes based on the prediction traffic information, create cost information by referencing the prediction traffic information at the predicted passage time, and/or distribute the DRG data to the onboard device 31. According to various exemplary implementations, only data useful for DRG may be distributed to the onboard device 31.

The information providing server 11 may include a communication unit 17, for example, for performing communication with the onboard device 31. For example, upon reception of a DRG information distribution request, and/or distribution request for facilities or points data, the communication unit 17 may identify the onboard device 31 which transmitted the distribution request, and transmit distribution information created by the controller 21 to the identified onboard device 31.

Next, various exemplary navigation methods, for example, for use with the above-described exemplary configuration, will be described. First, exemplary methods of creating prediction link travel time patterns will be described with reference to FIGS. 3-5.

Figure 3:
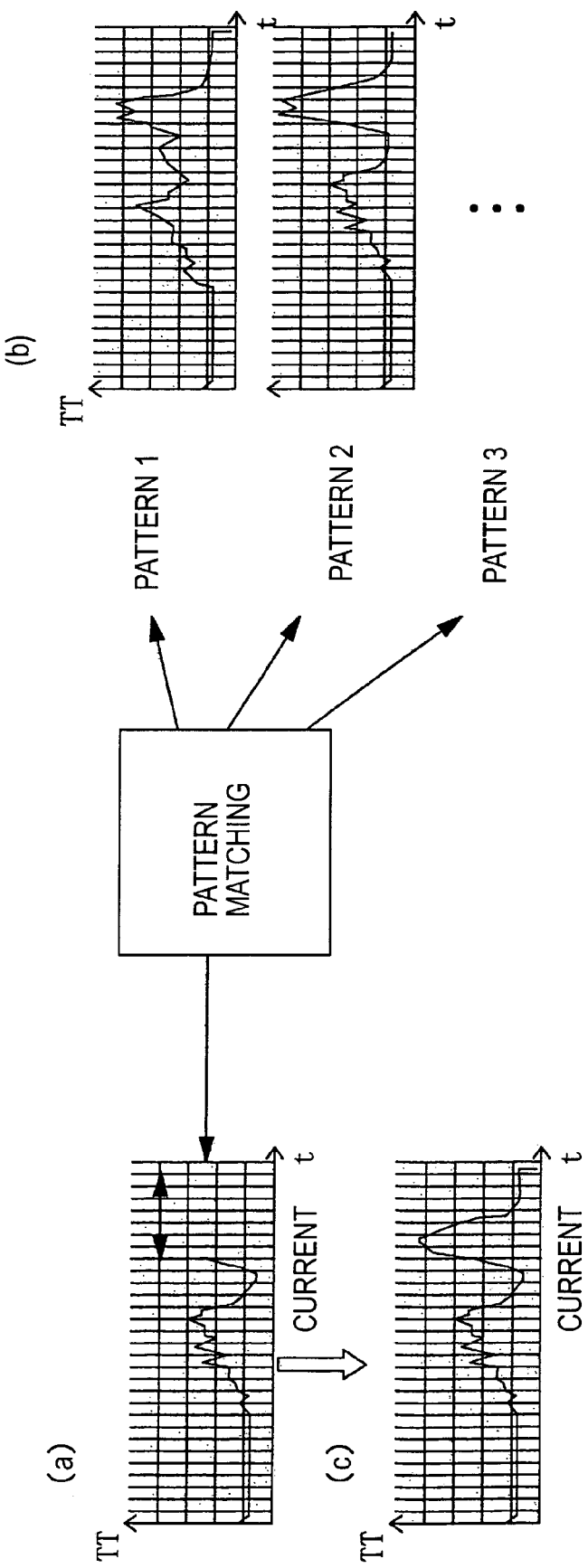
FIG. 3 is a first exemplary diagram illustrating a method for creating a short-term prediction link travel time pattern according to an exemplary implementation of the principles described herein.
Figure 4:
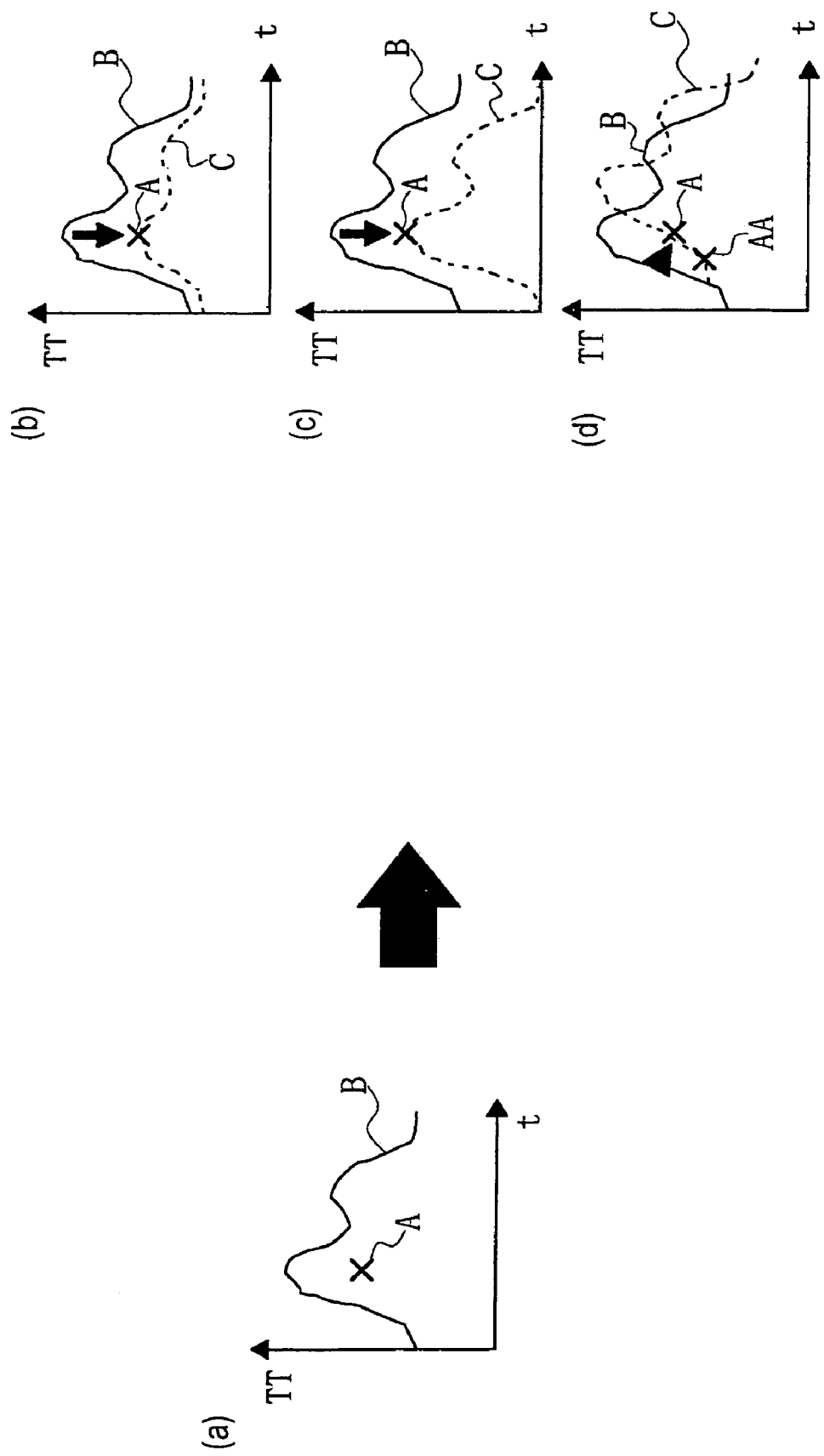
FIG. 4 is a second exemplary diagram illustrating a method for creating a short-term prediction link travel time pattern according to an exemplary implementation of the principles described herein.
Figure 5:
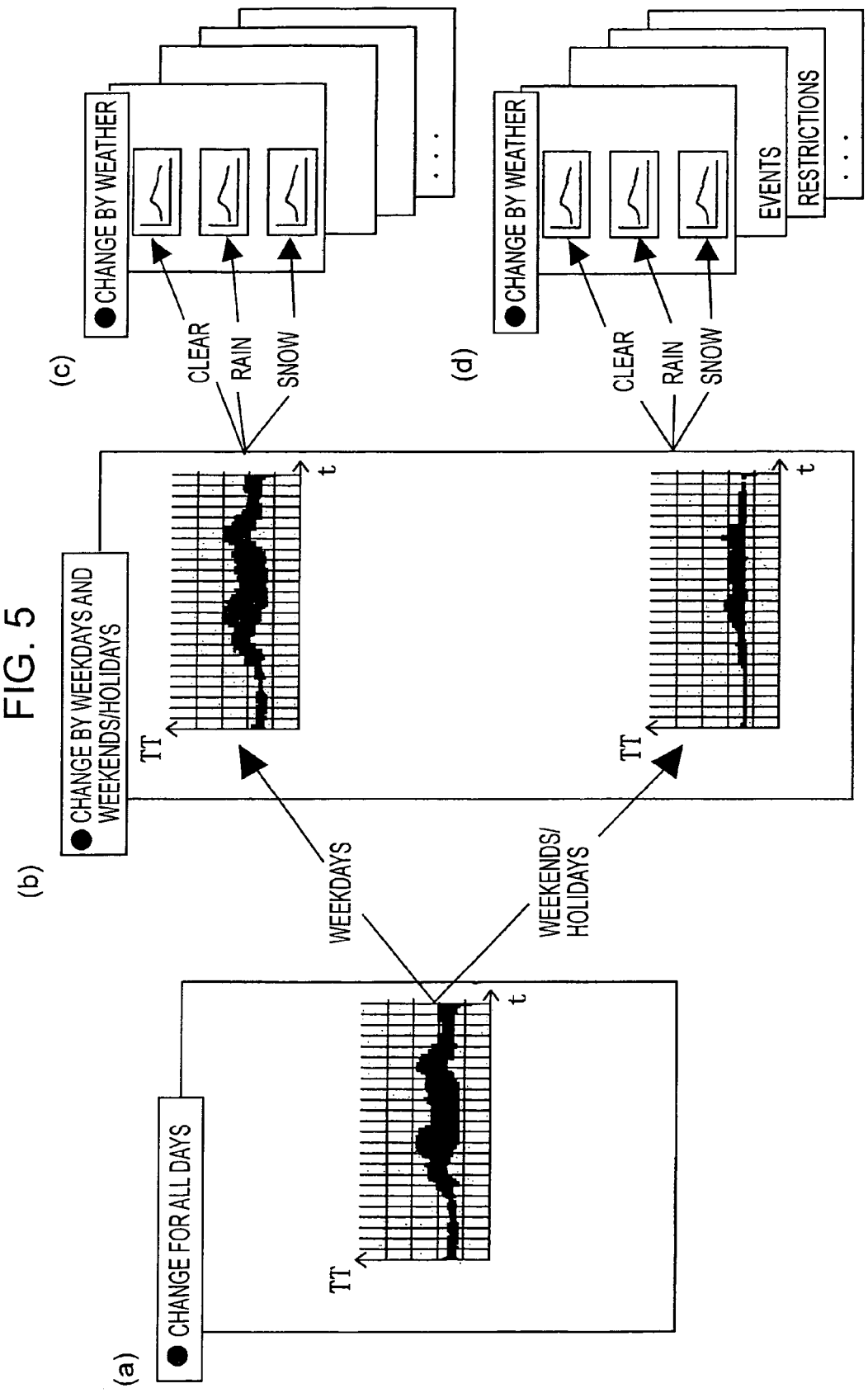
FIG. 5 is an exemplary diagram illustrating a method for creating a long-term prediction link travel time pattern according to an exemplary implementation of the principles described herein.

FIG. 3 is a first exemplary diagram illustrating a method for creating a short-term prediction link travel time pattern. FIG. 4 is a second exemplary diagram illustrating a method for creating a short-term prediction link travel time pattern. FIG. 5 is an exemplary diagram illustrating a method for creating a long-term prediction link travel time pattern.

In order to predict link travel times, for example, the prediction processing unit 24 may create short-term and long-term prediction link travel time patterns. When creating short-term prediction link travel time patterns, the prediction processing unit 24 may use a current state and past data to creates prediction link travel time patterns. Prediction link travel time patterns may be created, for example, by pattern matching and/or waveform compensation, based on the current driving state of the vehicle, for example, received from the onboard device 31. The prediction period for creating a short-term prediction link travel time pattern can be optionally set, such as up to around two hours from the current time, for example.

An exemplary method of creating a prediction link travel time pattern by a pattern matching method will be described with reference to FIG. 3. A prediction link travel time pattern of the vehicle during a predetermined period in the past leading up to the current time is created, as shown in FIG. 3(a), based on the data indicating the state of the vehicle in which the onboard device 31 is installed. This pattern may be created, for example by the prediction section 24. A predetermined period in the past may be, for example, from 12 o'clock midnight of today up to the current time, but may be optionally set. In the prediction link travel time pattern shown in FIG. 3(a), the horizontal axis is time of day (t), and the vertical axis indicates the total travel time (tt) necessary to travel the link.

Next, traffic information, for example, stored in the traffic information section 13, is accessed and the created link travel time pattern is compared with past link travel time patterns, which may be, for example, stored in the traffic information database 13 beforehand, as indicated in FIG. 3(b). This may be done, for example, by the prediction section 24. Note that the past link travel time patterns shown in FIG. 3(b) illustrate the change of the total travel time (tt) in one day, as with the link travel time pattern shown in FIG. 3(a). Then a past link travel time pattern is extracted from the past link travel time patterns which most closely matches the created link travel time pattern in a range from the pattern's point of origin to the current time.

Next, the link travel time pattern in the prediction period following the current time is extracted from the most closely matching past the link travel time pattern. The extracted portion of the most closely matching past the link travel time pattern is then added to the created link travel time pattern. Accordingly, as shown in FIG. 3(c), a prediction link travel time pattern including the link travel time pattern shown in FIG. 3(a), and the portion extracted from the past link travel time patterns can be obtained. The steps may be performed, for example, by the prediction section 24.

Next, description will be made regarding a case of creating a prediction link travel time pattern by a waveform compensation method will be described with reference to FIG. 4. In this case, a past average link travel time pattern, for example, stored in the traffic information section 13 beforehand, is used. Point A shown in FIG. 4(a) is a point indicating the current state at the current time of the vehicle in which the onboard device 31 is installed. This information may be received from the onboard device 31. The line B in FIG. 4(a) illustrates a past average link travel time pattern. Note that in the link travel time pattern shown in FIG. 4(a), the horizontal axis represents time of day (t) and the vertical axis represents the total travel time (tt) necessary to travel the link. These steps may be preformed, for example by the prediction section 24.

Next, a link travel time pattern C is created by adjusting the past average link travel time pattern B so as to match point A. For example, as shown in FIG. 4(b), the past average link travel time pattern B can be equi-proportionately changed so as to create a prediction link travel time pattern C. That is to say, the value of the total travel time (tt) indicated by the line B at the time (t) corresponding to point A is changed to the total travel time (tt) indicated by point A. The value of the total travel time (tt) indicated by line B at all times (t) is then changed, based on the ratio of the post-alteration value of the time corresponding to point A as to the pre-alteration value thereof. Accordingly, the value of the total travel time (tt) indicated by line B in all time ranges is changed at a ratio equal to the ratio of the post-alteration value at the time corresponding to point A as to the pre-alteration value, whereby a prediction link travel time pattern such as indicated by line C in FIG. 4(b) can be created. These steps may be preformed, for example, by the prediction section 24.

Alternatively, for example, as shown in FIG. 4(c), a prediction link travel time pattern C can be created by moving the past average link travel time pattern B as a whole in the vertical direction. That is to say, the value of the total travel time (tt) indicated by line B at the time (t) corresponding to the point A is changed to the value of the total travel time (tt) indicated by the point A. Then, the value of the total travel time (tt) indicated by line B at all times (t) is changed according to the difference of the post-alteration value at the time (t) corresponding to point A as to the pre-alteration time. Accordingly, the value of the total travel time (tt) indicated by line B in all time ranges is changed by a value equal to the difference of the post-alteration value at the time (t) corresponding to the point A as to the pre-alteration value, whereby a prediction link travel time pattern such as indicated by line C in FIG. 4(c) can be created. These steps may be preformed, for example, by the prediction section 24.

Alternatively, for example, as shown in FIG. 4(d), the past average link travel time pattern B can be tilted so as to match a line indicating history, thereby creating a prediction link travel time pattern C. In this case, the entire line B is titled so as to pass through the point A and the point AA indicating a state of the vehicle prior to the current time. Thus, a prediction link travel time pattern such as indicated by line C in FIG. 4(d) can be created. These steps may be preformed, for example, by the prediction section 24.

Next, in the event of creating a long-term prediction link travel time pattern, a prediction link travel time pattern without feedback of the current state may be created. For example, past link travel time patterns, for example stored in the traffic information database 13, may be statistically analyzed, and a prediction link travel time pattern may be created. An example of the prediction period in a long-term prediction is a period from the current time up to around two hours later, but this can be set optionally.

An example of a method for creating a long-term prediction link travel time pattern is shown-in FIG. 5. First, past link travel time patterns, for example stored in the traffic information database 13 beforehand, are obtained as shown in FIG. 5(a). Note that the link travel time pattern shown in FIG. 5(a) illustrates the change in total travel time (tt) over the scale of one day, but includes the change for all link travel time patterns, i.e., for all days, on the same graph overlapping. Also, in the link travel time pattern shown in FIG. 5(a), the horizontal axis illustrates time of day (t), and the vertical axis total travel time (tt) necessary to travel the link.

Next, the link travel time pattern shown in FIG. 5(a) is divided into sub-patterns according to the calendar. For example, as shown in FIG. 5(b), the link travel time pattern is divided into a weekday link travel time pattern and a weekend/holiday link travel time pattern. As used herein weekend/holiday means Saturdays, Sundays, and holidays, while weekday means all other days. Furthermore, link travel time patterns can be extracted specifically for particular dates or periods, such as, for example, summer vacation, Thanksgiving, the Christmas and New Year holiday season, etc. Further, irregularity in data can be reduced by eliminating abnormal values from the link travel time patterns. These steps may be preformed, for example, by the prediction section 24.

Next, the link travel time pattern may be again divided according to the calendar, and/or according to occurrences such as, for example, weather, events, and/or restrictions. Here, as shown in FIG. 5(c) and (d), patterns may be divided according to the weather, for example, into a link travel time pattern for clear weather, a link travel time pattern for rain, and a link travel time pattern for snow. Thus, a prediction link travel time pattern can be obtained for the state of the vehicle in which the onboard device 31 is installed, e.g., a weekend in the snow. These steps may be preformed, for example, by the prediction section 24.

Note that the total link travel time (tt) is the time required to pass through each link, and that the length of each link may be stored in the road information section 14, so the travel speed in each link may be calculated from the total link travel time (tt) for each link. Accordingly, a prediction speed pattern can be obtained based on the prediction link travel time pattern. Also, the degree of congestion serving as congestion information in the VICS® information may be defined as, for example, "congested," "heavy," or "not congested" according to the road type and travel speed, so congestion information at each link may also be obtained from the link travel time for each link. Accordingly, congestion prediction information may be obtained based on the prediction link travel time pattern.

Figure 6:
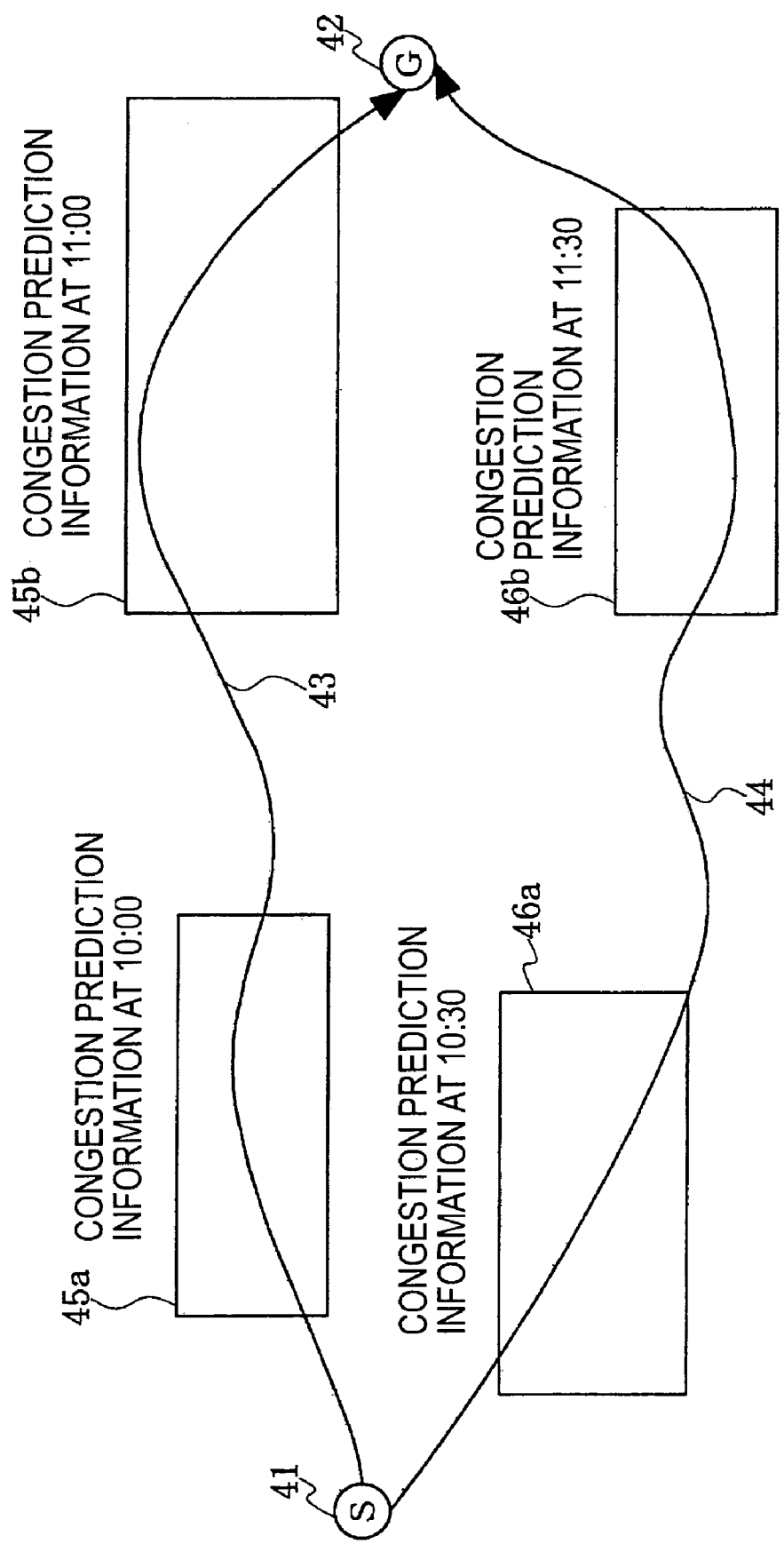
FIG. 6 is an exemplary diagram showing DRG information to be distributed according to an exemplary implementation of the principles described herein.
Figure 7:
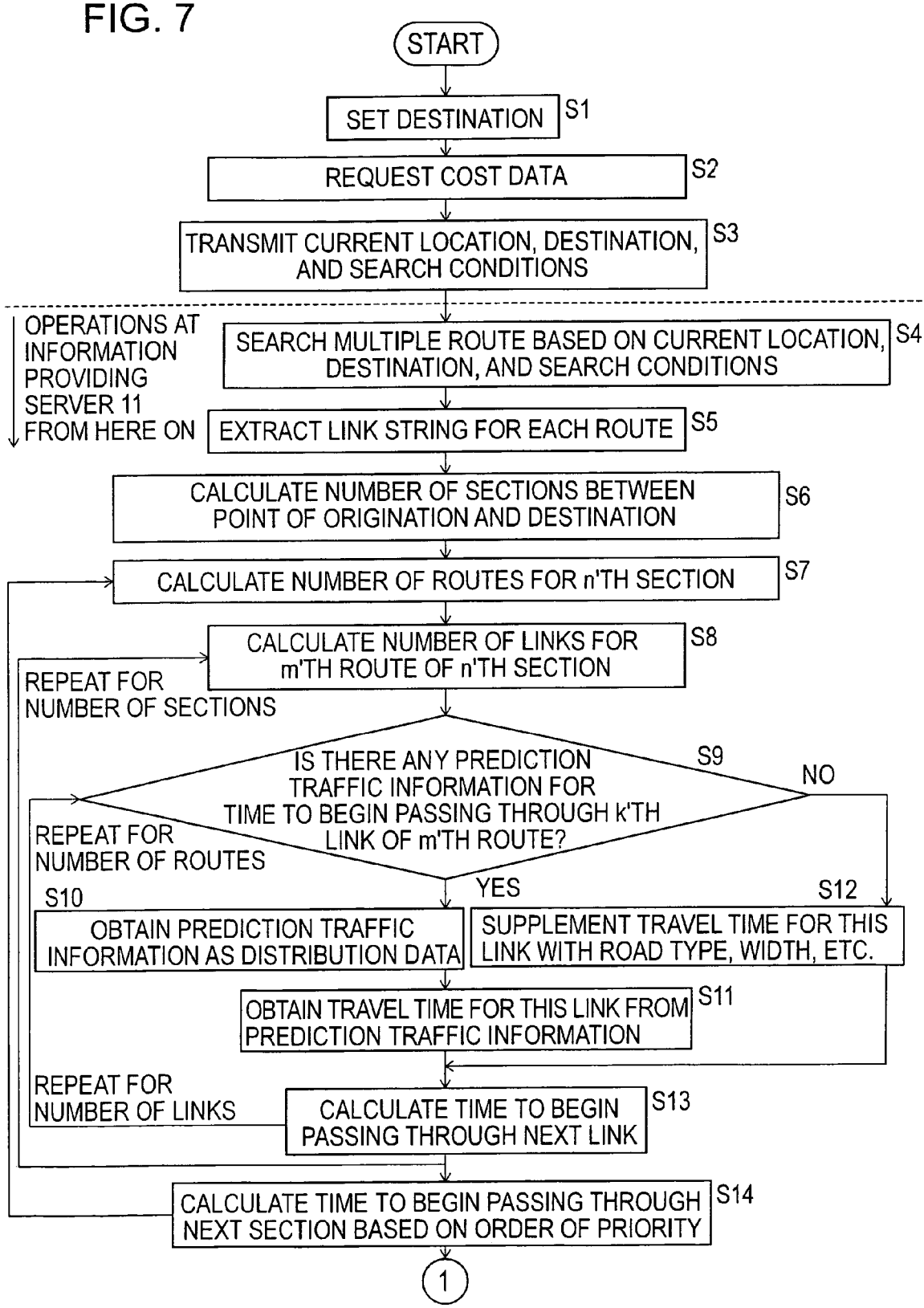
FIGS. 7-10 illustrate an exemplary navigation method according to an exemplary implementation of the principles described herein.
Figure 8:
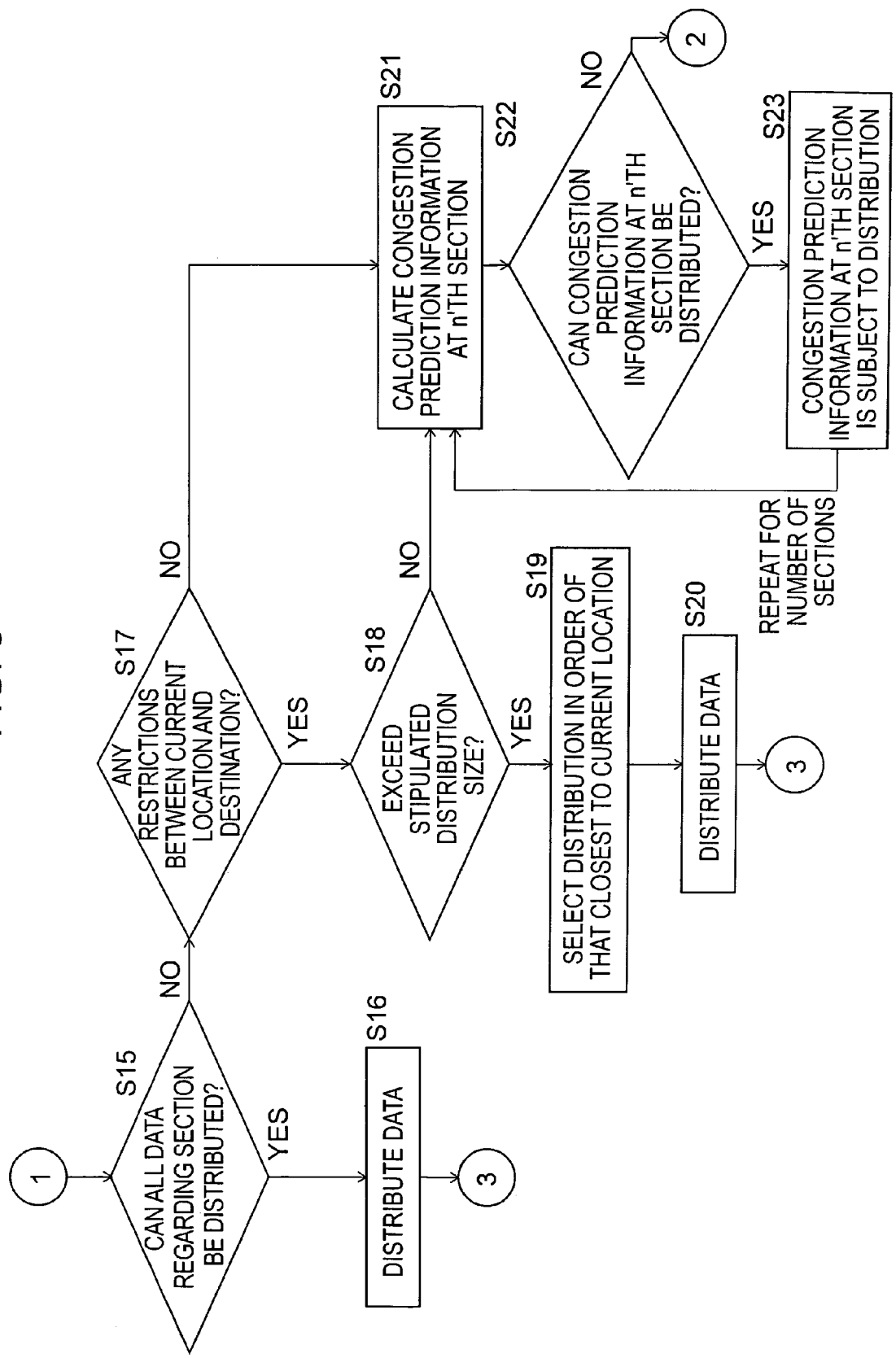
Figure 9:
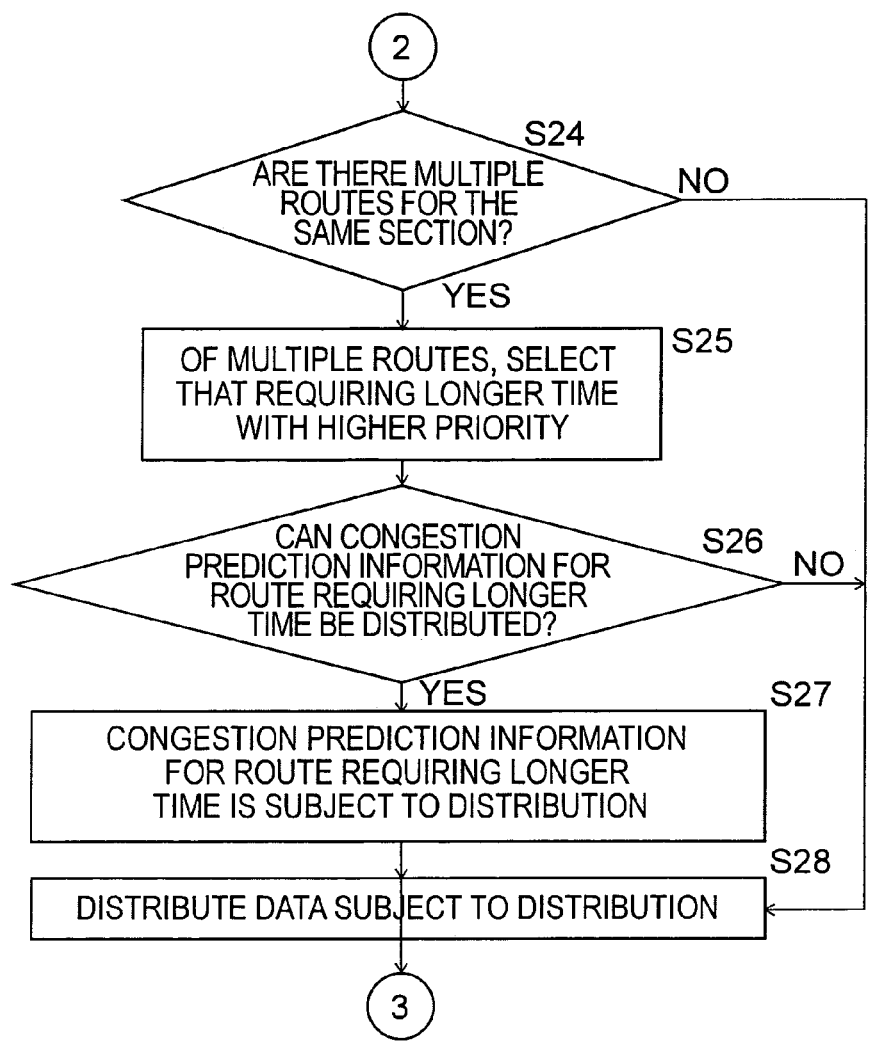
Figure 10:
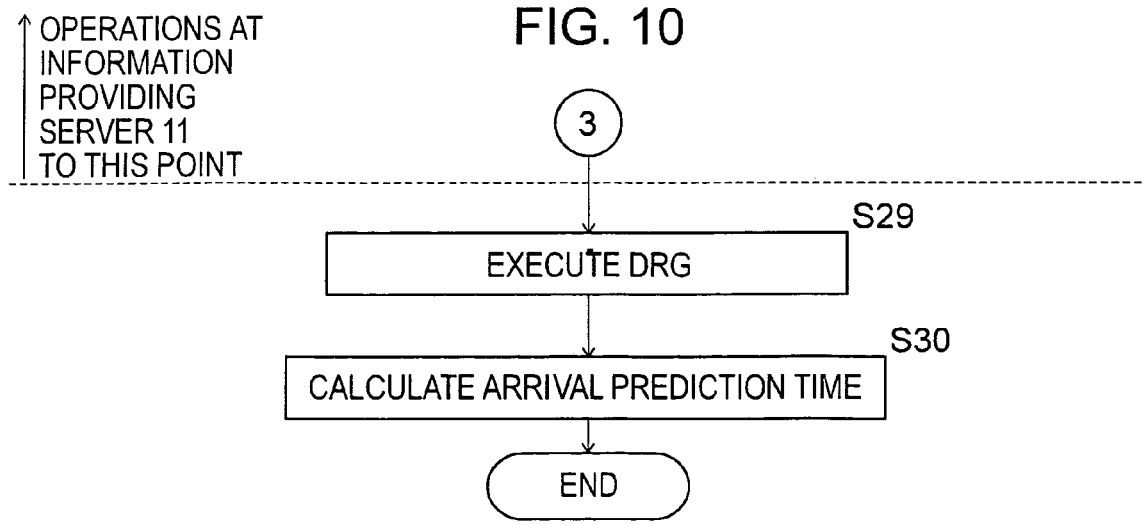

Next, an exemplary method of creating and distributing DRG data will be described. FIG. 6 is a diagram describing the basic concept of distributing DRG information.

The information providing server 11 may search for routes to the destination with the current location as the point of departure, based on, for example, the current location, destination, and/or search conditions, included in the DRG information distribution request received, for example, from the onboard device 31. The information providing server 11 may then search multiple routes, calculate the predicted passage time at which the vehicle will pass each link of each of the multiple routes based on the prediction link travel time pattern. The information providing server may create distribution information by making reference to the prediction traffic information at the predicted passage time, and distribute the DRG distribution data, for example, to the onboard device 31. Thus, a recommended route and a substitution route, which is a route capable of serving as a substitution for the recommended route, may be searched. Congestion may be predicted for each of the links of the recommended route and the substitute route. The distribution data may further include prediction traffic information, which includes a least congestion prediction information. Thus, the onboard device 31 may perform DRG using the received data, and may search routes avoiding congestion.

As shown in FIG. 6, assume a search from the point of departure 41 to the destination 42, is performed. Also assume that highways will be used whenever available (search conditions). Two routes, route 43 and route 44, are searched. Route 43 is the recommended route, and route 44 is the substitute route. Occurrence of congestion on the route 43 and route 44 is predicted based on the prediction link travel time patterns created as described above, and congestion prediction information is created for regions where occurrence of congestion is predicted. The reference time of the congestion prediction information is the time at which the vehicle is expected to pass that region. The reference time is set based on the passage prediction time of the vehicle at the links of the route 43 and route 44.

In the example shown in FIG. 6, congestion is predicted for region 45a and 45b on route 43. Congestion prediction information at 10:00, which is the passage prediction time of the vehicle, is created for the region 45a, and congestion prediction information at 11:00, which is the passage prediction time of the vehicle, is created for the region 45b. Also, congestion is predicted for region 46a and 46b on route 44. Congestion prediction information at 10:30, which is the passage prediction time of the vehicle, is created for the region 46a, and congestion prediction information at 11:30, which is the passage prediction time of the vehicle, is created for the region 46b.

Information for the searched route 43 and route 44, such as, information including prediction traffic information and congestion prediction information for region 45a, region 45b, region 46a, and region 46b, is distributed from, for example, the information providing server 11 to the onboard device 31 as distribution information for DRG. Accordingly, the onboard device 31 can perform DRG using the received DRG distribution information, and search routes that avoid congestion. Also, the time of arrival at the destination 42 can be accurately calculated.

Figure 1:
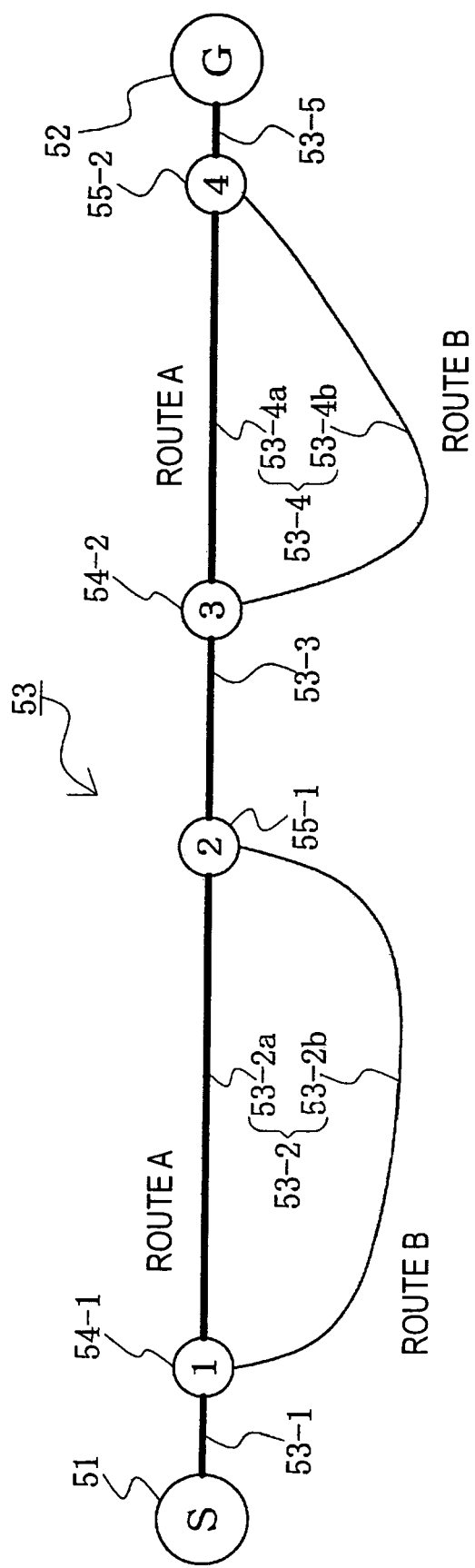
FIG. 1 is a diagram illustrating routes searched according to an exemplary implementation of the principles described herein.

Next, an exemplary navigation method, for example, of use with the above described navigation system will be described with reference to FIGS. 1 and 7-10. FIG. 1 is a diagram illustrating routes searched according to the exemplary method. FIGS. 7-10 illustrate the exemplary navigation method.

First, the destination is set (step S1). For example, an operator may operate the input device of the onboard device 31 to set the destination. Note that search conditions, such as using a freeway whenever available, may be set as necessary. Next, cost data is requested (step S2). For example, the operator may operate the input device of the onboard device 31 to press a cost data request button serving as means for transmitting a DRG information distribution request to the information providing server 11. Next, one or more of at least current location, destination, and/or search conditions are transmitted (step S3). For example, the onboard device 31 may transmit the current location, destination, search conditions, etc., as a distribution request for DRG information, to the information providing server 11.

Subsequently, multiple routes are searched based on the transmitted information (step S4). For example, upon receiving the current location, destination, search conditions, etc., as the distribution request for DRG information from the onboard device 31, the information providing server 11 may search multiple routes to the destination with the current position as the point of departure based on the current location, destination, search conditions, etc. For example, assume a route using a freeway has been searched, as shown in FIG. 1.

In FIG. 1, reference numeral 51 denotes the point of departure, and 52 denotes the destination. Reference numeral 53 denotes the routes from the point of departure 51 to the destination 52, which branches into two routes, route A and route B, at multiple sections. Here, the branching points and merging points of the route A and route B are 54-1 and 54-2, and 55-1 and 55-2, respectively. The route 53 is divided into first through fifth sections 53-1 through 53-5 by the branching point 54-1 and branching point 54-2, and merging point 55-1 and merging point 55-2. Note that the second section 53-2 branches into the second section 53-2a of the route A and the second section 53-2b of the route B. The fourth section 53-4 branches into the fourth section 53-4a of the route A and the fourth section 53-4b of the route B. Thus, the route A is made up of the first section 53-1, second section 53-2a, third section 53-3, fourth section 53-4a, and fifth section 53-5. The route B is made up of the first section 53-1, second section 53-2b, third section 53-3, fourth section 53-4b, and fifth section 53-5. Note that the branching point 54-1 and branching point 54-2 will be described as branching points 54 when referred to collectively, and the merging point 55-1 and merging point 55-2 will be described as merging points 55 when referred to collectively.

Next, link stings are extracted for each of the multiple routes (step S5). For example, the information providing server 11 may extract strings made up of links on the searched route A and route B, i.e., link strings for each route. Then, the number of sections from the point of departure to the destination is calculated (step S6). For example, the number of sections from the point of departure 51 to the destination 52, i.e., the number of sections between point of departure to destination is calculated based on the branching points 54 and merging points 55. In the example shown in FIG. 1, the number of sections is five.

Next, the number of routes of the n'th section is calculated (step S7). For example, the information providing server 11 may calculate the number of routes of the n'th section. Note that n is an integer between 1 and the number of sections, and is sequentially incremented from 1. Next, the number of links on the m'th route of the n'th section is calculated (step S8). For example, the information providing server 11 may calculate the number of links on the m'th route of the n'th section. Note that m is an integer between 1 and the number of routes, and is sequentially incremented from 1. It is then determined whether there is prediction traffic information at the time at which the k'th link of the m'th route will be passed through (step S9). For example, the information providing server 11 may determine whether there is prediction traffic information at the time at which the k'th link of the m'th route will be passed through. Here, prediction traffic information is congestion prediction information such as, for example, link travel time or degree of congestion, or restriction information relating to closed roads, such as freeway entrances being closed, exits being closed, and so forth.

In the event that there is prediction traffic information (step S9=yes), the prediction traffic information as distribution data is obtained (step S10) and the travel time is obtained based on the obtained information (step S11). For example, the information providing server 11 may obtain the prediction traffic information as distribution data, and may obtain the travel time of the link from the prediction traffic information. That is to say, the amount of time required to pass through the link may be obtained based on the congestion prediction information or restriction information. If there is no prediction traffic information (step S9=no), travel time for the link is calculated based on road information (step S12). For example, the information providing server 11 may supplement the travel time of the link according to type of road, road width, and so forth. For example, with supplementation according to road type, for general roads, the travel time may be calculated with a speed of 30 km, and a speed of 80 km for freeways. Also, with supplementation according to road width, the travel time may be calculated with a speed of 30 km for general roads having one lane each way, a speed of 35 km for general roads having two lanes each way.

Next, the time to begin passing through the next link is calculated (step S13). For example, the information providing server 11 may calculate the time to begin passing through the next link. Then, the value k is incremented by 1, and it is again determined whether there is prediction traffic information for the time to begin passing through the k'th link (step S9). Subsequently, the aforementioned operation is repeated for each of the remaining links. Once this operation is repeated for all links in the m'th route, this m is incremented by 1, and the number of links in the m'th route again calculated (step S8). Subsequently, the above-described operation is repeated for each of the remaining routes in the n'th section. Upon repeating this operation of all routes in the n'th section, the time to begin passing through the next section based on the order of priority is calculated (step S14). For example, the information providing server 11 may calculate the time to begin passing through the next section based on the order of priority. Next, this n is incremented by 1 and the number of routes in the n'th section is calculated (step S7). Subsequently, the above-described operation is repeated for each of the remaining sections.

The order of priority may be determined, for example, based on the time to begin passing through a route with the shortest time required. Accordingly, in the example shown in FIG. 1, the time to begin passing through the first section 53-1 is the point of departing the point of departure 51. Next, the time to begin passing through the second section 53-2 is the predicted time of arrival at the branching point 54-1. The time to begin passing through the third section 53-3 is the quicker of the predicted times of arrival at the merging point 55-1, i.e., either via section 53-2a or 53-2b. Next, the time to begin passing through the fourth section 53-4 is the predicted time of arrival at the branching point 54-2. Next, the time to begin passing through the fifth section 53-5 is the quicker of the predicted times of arrival at the merging point 55-2, i.e., either via section 53-4a or 53-4b. This is because in the event of selecting routes using the DRG data received by the onboard device 31, the route with a shorter time required may be selected.

Next, it is determined whether all distribution data can be distributed for each of the sections (step S15). For example, the information providing server 11 may determine whether distribution data can be distributed for each of the sections. Here, the distribution data may include, for example, congestion prediction information and/or restriction information, for each of the links. In the event that it can be distributed (step S15=yes), the data is distributed (step S16). For example the information providing terminal 11 may distribute the distribution data to the onboard device 31. If distribution cannot be performed (step S15=no), it is determined whether there is restriction information regarding closed roads along the routes to the destination (step S17). For example, the information providing server 11 may determine whether there are any restrictions between the current location and the destination. In the event that there are restrictions (step S17=yes), it is determined whether the restriction information for the routes to the destination exceeds the data size that can be distributed (step S18). For example, the information providing server 11 may determine whether the restriction information exceeds a data size, which can be distributed. If the restriction information this exceeds the distribution size (step S18=yes), it cannot be distributed, so the data that is set to be distributed is selected in order based on a distance to a current location (step S19). For example, the information providing server 11 may sequentially select the data to be distributed to the onboard device 31, in order from that closer to the current location. Subsequently, the data is distributed in order (step S20). For example, the information providing server 11 may distribute the selected distribution data to the onboard device 31.

On the other hand, if there are no restrictions (step S17=no), or in the event that the restriction data does not exceed the stipulated distribution size (step S18=no), the congestion prediction information at the n'th section is calculated (step S21) and determines the congestion prediction information at the n'th section can be distributed (step S22). For example, the information providing server 11 may calculate the congestion prediction information at the n'th section, and may determine whether the congestion prediction information at the n'th section can be distributed. The congestion prediction information is prediction information of congestion degree defined, for example, as "congested," "heavy," or "not congested," according to, for example, the road type and travel speed. If distribution can be made (step S22=yes), the congestion prediction information at the n'th priority-order section is set for distribution (step S23), the n is incremented by 1, and the congestion prediction information at the n'th section is calculated (step S21). For example, the information providing server 11 may take the congestion prediction information at the n'th priority-order section as the object of distribution, may increment n by 1, and may calculate congestion prediction information at the n'th section. Subsequently, this operation is repeated for each of the remaining sections.

For example, the order of priority of the information obtained for determining whether to distribute the data may be in the following order (1) through (6) with the example shown in FIG. 1. (1) Restriction information relating to closed roads on the route 53 from the point of departure 51 to the destination 52. (2) Congestion prediction information for the first section 53-1. (3) Congestion prediction information for the second section 53-2. (4) Congestion prediction information for the third section 53-3. (5) Congestion prediction information for the fourth section 53-4. (6) Congestion prediction information for the fifth section 53-5. In the event that there are multiple routes for each section, the route with the longer time required is given higher priority.

If congestion prediction information at the n'th priority-order section cannot be distributed (step S22=no), it is determined whether there are multiple routes in the same section (step S24). For example, the information providing server 11 may determine whether there are multiple routes in the same section. If there are multiple routes (step S24=yes), the route with the longer time having the higher priority is selected (step S25). For example, the information providing server 11 may select from the multiple routes the one with the longer time required with higher priority. Subsequently, it is determined whether congestion prediction information for the selected route can be distributed (step S26). For example, the information providing server 11 may determine whether congestion prediction information for the route with the longer time required can be distributed. If it can be distributed (step S26=yes), the congestion prediction information for the route with the longer time required is distributed, for example, to the onboard device 31 as the object of distribution(steps S27 and S28).

If there are not multiple routes in the same section (step S24=no) or congestion prediction information for the route with the longer time required cannot be distributed (step S26=no), the data, which is the object of distribution, is distributed. This may be done for example by the information providing server 11.

Upon receiving the distributed data, DRG is performed (step S29) for example, upon receipt of data distributed from the information providing server 11, the onboard device 31 may perform DRG and may search a route avoiding congestion. Then, the predicted time of arrival is calculated (step S30). For example, the onboard device 31 may calculate the predicted time of arrival at the destination 52. The exemplary method ends.

Thus, if implementing the above described exemplary method, the information providing server 11 may search multiple routes to the destination, may calculate the predicted time of passage for passing through each of the links in each of the routes based on prediction traffic information so as to create cost data, and may distribute data for DRG to the onboard device 31. In the event that the cost data cannot be distributed, only restriction information, congestion prediction information, etc., may be distributed to the onboard device 31 as data useful for DRG according to a predetermined order of priority.

Accordingly, the amount of data communication between the information providing server 11 and the onboard device 31 may be reduced, communication time may be shortened, and communication expenses may be suppressed. Moreover, data useful for DRG may be distributed to the onboard device 31, so the onboard device 31 may use the received data and perform DRG to search routes avoiding congestion. Also, the predicted time of arrival at the destination may be accurately calculated.

It should be appreciated that while, for ease of explanation, the above-describe exemplary methods are described as being implemented by the exemplary system of FIG. 2, the methods are independent from the structure of the exemplary system and may be implemented by any system of systems capable of performing the exemplary methods.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A navigation system, comprising:
   a memory that stores traffic information; and
   a controller that:
      creates prediction traffic information based on the traffic information stored in the memory, the prediction traffic information including restriction information and congestion prediction information;
      searches a route to a destination, the route including at least one link;
      calculates a predicted passage time of each link in the route;
      obtains, for each link, the prediction traffic information at the predicted passage time from the created prediction traffic information;
      determines whether the obtained prediction traffic information for all links of the route can be distributed; and
      extracts the restriction information for each link of the obtained prediction traffic information as distribution information according to a predetermined priority when the obtained prediction traffic information for all links of the route cannot be distributed.

2. The navigation system of claim 1, wherein the controller creates prediction traffic information by creating a short-term prediction link travel time pattern according to a pattern matching method.

3. The navigation system of claim 1, wherein the controller creates prediction traffic information by creating a short-term prediction link travel time pattern according to a waveform compensation method.

4. The navigation system of claim 1, wherein the controller creates prediction traffic information by dividing a long-term prediction link travel time pattern into at least one sub-pattern.

5. The navigation system of claim 1, wherein:
   the controller creates a prediction link travel time pattern based on link travel time patterns stored in the memory; and
   creates the congestion prediction information based on the prediction link travel time pattern.

6. The navigation system of claim 1, wherein the controller:
- searches a plurality of routes to the destination, each of the routes including at least one link;
- calculates a predicted passage time of each link in each of the routes; and
- obtains, for each link, the prediction traffic information at the predicted passage time.

7. The navigation system of claim 1, wherein the controller:
- determines whether the restriction information of all of the links in the route exceed a predetermined distribution data size;
- extracts the restriction information of the links along the route in an order starting with the links closer to a point of departure of the route as distribution information when the restriction information of all of the links in the route exceed the predetermined distribution data size; and
- extracts the restriction information of each link and the congestion prediction information of the links along the route in an order starting with the links closer to the point of departure of the route as distribution information when the restriction information of all of the links in the route do not exceed the predetermined distribution data size.

8. The navigation system of claim 1, wherein the controller:
- determines whether no restriction information is included in the obtained prediction traffic information of each link; and
- extracts the congestion prediction information of the links along the route in an order starting with the links closer to a point of departure of the route as distribution information when no restriction information is included in the obtained prediction traffic information of each link.

9. An information server comprising the navigation system of claim 1.

10. A navigation system, comprising:
- a server comprising:
  - a memory that stores traffic information; and
  - a controller that:
    - creates prediction traffic information based on the traffic information stored in the memory, the prediction traffic information including restriction information and congestion prediction information;
    - searches a route to a destination, the route including at least one link;
    - calculates a predicted passage time of each link in the route;
    - obtains, for each link, the prediction traffic information at the predicted passage time from the created prediction traffic information;
    - determines whether the obtained prediction traffic information for all links of the route can be distributed; and
    - extracts the restriction information for each link of the obtained prediction traffic information as distribution information according to a predetermined priority when the obtained prediction traffic information for all links of the route cannot be distributed; and
- an onboard device that performs a route search using the distribution information to search a route to the destination.

11. A navigation method, comprising:
- storing traffic information;
- creating prediction traffic information based on the traffic information stored in the memory, the prediction traffic information including restriction information and congestion prediction information;
- searching a route to a destination, the route including at least one link;
- calculating a predicted passage time of each link in the route;
- obtaining, for each link, the prediction traffic information at the predicted passage time from the created prediction traffic information;
- determining whether the obtained prediction traffic information for all links of the route can be distributed; and
- extracting the restriction information for each link of the obtained prediction traffic information as distribution information according to a predetermined priority when the obtained prediction traffic information for all links of the route cannot be distributed.

12. The navigation method of claim 11, wherein creating prediction traffic information comprises creating a short-term prediction link travel time pattern according to a pattern matching method.

13. The navigation method of claim 11, wherein creating prediction traffic information comprises creating a short-term prediction link travel time pattern according to a waveform compensation method.

14. The navigation method of claim 11, wherein creating prediction traffic information comprises dividing a long-term prediction link travel time pattern into at least one sub-pattern.

15. The navigation method of claim 11, wherein creating prediction traffic information comprises:
- creating a prediction link travel time pattern based on link travel time patterns stored in the memory; and
- creating the congestion prediction information based on the prediction link travel time pattern.

16. The navigation method of claim 11, further comprising:
- searching a plurality of routes to the destination, each of the routes including at least one link;
- calculating a predicted passage time of each link in each of the routes; and
- obtaining, for each link, the prediction traffic information at the predicted passage time.

17. The navigation method of claim 11, further comprising:
- determining whether the restriction information of all of the links in the route exceed a predetermined distribution data size;
- extracting the restriction information of the links along the route in an order starting with the links closer to a point of departure of the route as distribution information when the restriction information of all of the links in the route exceed the predetermined distribution data size; and
- extracting the restriction information of each link and the congestion prediction information of the links along the route in an order starting with the links closer to the point of departure of the route as distribution information when the restriction information of all of the links in the route do not exceed the predetermined distribution data size.

18. The navigation method of claim 11, further comprising:
- determining whether no restriction information is included in the obtained prediction traffic information of each link; and extracting the congestion prediction information of the links along the route in an order starting with the links closer to a point of departure of the route as distribution information when no restriction information is included in the obtained prediction traffic information of each link.

19. The navigation method of claim 11, further comprising:
distributing the distribution information; and
performing a route search using the distribution information to search a route to the destination.

20. A computer-readable storage medium storing a computer-executable program the program comprising:
instructions for storing traffic information;
instructions for creating prediction traffic information based on the traffic information stored in the memory, the prediction traffic information including restriction information and congestion prediction information;
instructions for searching a route to a destination, the route including at least one link;
instructions for calculating a predicted passage time of each link in the route;
instructions for obtaining, for each link, the prediction traffic information at the predicted passage time from the created prediction traffic information;
instructions for determining whether the obtained prediction traffic information for all links of the route can be distributed; and
instructions for extracting the restriction information for each link of the obtained prediction traffic information as distribution information according to a predetermined priority when the obtained prediction traffic information for all links of the route cannot be distributed.

* * * * *